(12) United States Patent
Ziller et al.

(10) Patent No.: US 7,081,847 B2
(45) Date of Patent: Jul. 25, 2006

(54) RADAR SYSTEM WITH SWITCHABLE ANGULAR RESOLUTION

(75) Inventors: Thomas Ziller, Besigheim (DE); Uwe Papziner, Biehgheru (DE)

(73) Assignee: Valeo Schalter und Sensoren, Bietigheim-Bissingen (DE)

( * ) Notice: Subject to any disclaimer, the term of this patent is extended or adjusted under 35 U.S.C. 154(b) by 27 days.

(21) Appl. No.: 10/958,421

(22) Filed: Oct. 6, 2004

(65) Prior Publication Data

US 2005/0128132 A1 Jun. 16, 2005

(30) Foreign Application Priority Data

Oct. 10, 2003 (DE) ................ 103 48 226

(51) Int. Cl.
*G01S 7/28* (2006.01)

(52) U.S. Cl. ................ 342/70; 342/81; 342/154; 342/157; 342/158; 342/374; 342/423; 342/445

(58) Field of Classification Search ............ 342/70–72, 342/73–75, 78–81, 147, 154–158, 368–374, 342/423, 437, 445, 446
See application file for complete search history.

(56) References Cited

U.S. PATENT DOCUMENTS

| | | | |
|---|---|---|---|
| 5,614,909 A * | 3/1997 | Komatsu et al. | 342/70 |
| 5,815,112 A * | 9/1998 | Sasaki et al. | 342/70 |
| 6,043,772 A * | 3/2000 | Voigtlaender et al. | 342/70 |
| 6,137,434 A * | 10/2000 | Tohya et al. | 342/70 |
| 6,147,638 A * | 11/2000 | Rohling et al. | 342/109 |
| 6,750,810 B1 * | 6/2004 | Shinoda et al. | 342/149 |
| 6,762,711 B1 * | 7/2004 | Doerfler | 342/70 |
| 6,995,730 B1 * | 2/2006 | Pleva et al. | 343/876 |
| 2002/0067287 A1 * | 6/2002 | Delcheccolo et al. | 340/901 |
| 2002/0190895 A1 * | 12/2002 | Nakanishi et al. | 342/146 |

FOREIGN PATENT DOCUMENTS

| | | |
|---|---|---|
| DE | 100 56 002 | 5/2002 |
| DE | 100 63 437 | 7/2002 |
| EP | 0 831 551 | 3/1998 |
| EP | 1 306 925 | 5/2003 |
| EP | 1 324 068 | 7/2003 |
| JP | 2003 248055 | 12/2003 |
| WO | WO 2004/061475 | 7/2004 |

* cited by examiner

*Primary Examiner*—John B. Sotomayor
(74) *Attorney, Agent, or Firm*—Paul Vincent

(57) ABSTRACT

A radar system with a radar sensor (10) which comprises a transmitting module (20), a receiving module (22) and a supply network (64), wherein the transmitting module (20) comprises a first plurality of partial antennas (26, 28, 30, 32, 34) and the receiving module (22) comprises a second plurality of partial antennas (46, 48, 50), and wherein the supply network (64) operates at least one partial antenna (30) of the transmitting module (20) together with at least one partial antenna (48) of the receiving module (22) in a first operating mode, to obtain a first, low angular resolution, and wherein the supply network operates one group of partial antennas (26, 28, 30, 32, 34) of the transmitting module (20) together with a group of partial antennas (46, 48, 50) of the receiving module (22) in a second operating mode to obtain a second high angular resolution. The radar system is characterized in that the supply network (64) operates at least one partial antenna (30) of the transmitting module (20) together with a group of partial antennas (46, 48, 50) of the receiving module (22) or a group of partial antennas (26, 28, 30, 32, 34) of the transmitting module (20) together with at least one partial antenna (48) of the receiving module (22) in a further operating mode.

12 Claims, 4 Drawing Sheets

RADAR SYSTEM WITH SWITCHABLE ANGULAR RESOLUTION

This application claims Paris Convention priority of DE 103 48 226.1 filed Oct. 10, 2003 the complete disclosure of which is hereby incorporated by reference.

BACKGROUND OF THE INVENTION

The invention concerns a radar system having a radar sensor which comprises a transmitting module, a receiving module and a trigger switch, wherein the transmitting module comprises a first plurality of partial antennas, and the receiving module comprises a second plurality of partial antennas, and wherein, in a first operating mode, the trigger switch operates at least one partial antenna of the transmitting module together with at least one partial antenna of the receiving module to obtain a first, low angular resolution, and wherein, in a second operating mode, the trigger switch operates one group of partial antennas of the transmitting module together with a group of partial antennas of the receiving module to obtain a second, high angular resolution.

The invention also concerns a method for operating such a radar system.

A radar system and a method of this type are disclosed in EP 1 324 068 A2.

Radar sensors are generally used in automotive vehicles to monitor the surroundings of the vehicle for use as e.g. a parking aid, dead angle monitoring, accident anticipation (pre-crash sensing), start/stop operation or drive operation with distance control and/or regulation (cruise control support). The requirements for the angular resolution thereby differ from application to application.

Dead angle near-field monitoring (blind-spot-detection) requires a wide radiation field. Good angular resolution is less important. For maneuvering an automotive vehicle it is e.g. important to know whether an object is located at a blind spot, in which case an immediate stop is required. In contrast thereto, it is less important to know the exact location of the object, since the vehicle must be stopped in any event.

On the other hand, for distance control along a lane, distance information must not be disturbed by vehicles in neighboring lanes. This requires higher angular resolution. To be able to cover various angular resolution requirements with one single radar sensor, the angular resolution should be switchable or controllable.

Towards this end, in accordance with EP 1 324 068 A2, finger-like mutually engaging partial antennas of a transmitting module and a receiving module are operated either as individual pairs of transmitting partial antenna and receiving partial antenna or as groups (sets) of neighboring partial antennas. The two different operation modes thereby have two different azimuthal angular resolutions. Each partial antenna of EP 1 324 068 A2 is connected to a trigger switch via an independent separate switch. The plurality of switches and associated control paths requires a relatively large area in such an arrangement. This is true, in particular, in view of the limited number of operating modes which differentiate only between a high azimuthal resolution and a low azimuthal resolution.

In view of this prior art, it is the underlying purpose of the invention to provide a radar system with switchable angular resolution which permits a plurality of operating modes and which has minimum area and minimum switching requirements.

SUMMARY OF THE INVENTION

This object is achieved with a radar system of the above-mentioned type in that, in at least one additional mode of operation, the trigger switch operates at least one partial antenna of the transmitting module together with a group of partial antennas of the receiving module, or a group of partial antennas of the transmitting module together with at least one partial antenna of the receiving module.

The object of the invention is also achieved with a method of the above-mentioned type in that, in at least one further operating mode, at least one partial antenna of the transmitting module is operated together with a group of partial antennas of the receiving module, or a group of partial antennas of the transmitting module is operated together with at least one partial antenna of the receiving module.

This combination permits detection of different angular regions in which the radar sensor detects reflecting objects, through suitable combination of partial antennas of the transmitting module and the receiving module and with minimum switching effort. Clearly, the selected angular region must be in a radiation angle region of the transmitting partial antenna(s) and also in a receiving angle region of the receiving partial antenna(s).

The combinations of narrow or wide radiation angle regions with small or wide receiving angle regions, which can be switched with little effort, already produces up to four different angular regions with only two different widths, from the combinations wide/wide; wide/narrow; narrow/wide and narrow/narrow, and these can be selected with one or two switching processes. In consequence thereof, a considerably smaller number of radio frequency switches and associated control paths is required compared to prior art, which considerably reduces the surface area and the technical effort for switching associated with production of the transmitting modules and receiving modules, thereby completely achieving the object of the invention.

In the first operating mode, the trigger switch operates exactly one partial antenna of the transmitting module together with exactly one partial antenna of the receiving module.

Since the individual partial antennas have wide radiation and receiving characteristics compared to a plurality of synchronously operated partial antennas, the angular resolution obtained in this operating mode is low. The low angular resolution is, however, associated with a wide detection range in the vicinity of the radar sensor, such that this operating mode is particularly suited for monitoring the closer surroundings of the vehicle to detect e.g. objects in blind spots of the field of vision of a driver.

The group of partial antennas preferably also comprises the at least one partial antenna which is operated in the first operating mode.

This method further reduces the switching effort, since the one partial antenna must not be switched off. Switching is realized by connecting the other partial antennas to an already existing connection to thereby minimize expense.

The group of partial antennas preferably comprises all partial antennas of the transmitting module or the receiving module.

This design produces radiation characteristics or receiving characteristics with minimum angular width. A minimum angular width is highly suitable for monitoring remote regions. For a distance control system, information concerning the distance from a vehicle travelling ahead in the same lane must not be disrupted by vehicles in neighboring lanes.

It is thereby desirable to resolve one single lane at a distance of typically 30 to 100 meters.

A further preferred embodiment is characterized in that the partial antennas which are operated together in the first operating mode, are separately connected to the trigger switch.

This design minimizes the technical effort for switching. Since the partial antennas for the first operating mode are also active in the other operating modes, they may be connected to the trigger switch independently of operating mode switching.

The other partial antennas of a group are also preferably connected to the trigger switch via a common switch.

This design also minimizes the number of switches and the number of control paths to reduce the area required for the radar sensor.

The partial antennas are also preferably composed of several slit-coupled patch antennas.

Group radiators can be formed from such planar basic antenna elements through periodic arrangement of the basic antenna elements, whose dimensions and geometrical arrangement determine the radiation direction, i.e. the field distribution in front of the antenna. Suitable phase-controlled excitation of the periodically arranged basic antenna elements permits scanning of different spatial directions without changing the geometrical orientation of the radar sensor (principle of phased array radar).

The planar antenna structures are advantageous compared to conventional antennas in that they can be produced with inexpensive and compact light-weight construction and can be easily integrated into micro strip switches for wide frequency ranges (ca. 100 MHz to 100 GHz). The small thickness of the metal of the radiation surfaces and the fact that the electrically conducting surfaces of the patches need not have good electrical conducting properties, permit many different production methods.

A further preferred embodiment is characterized in that the transmitting module is disposed on the radar sensor at a spatial separation from the receiving module.

The surface required in this design is also reduced, since, in total, the trigger paths and control paths for associated switches may be shorter due to the local proximity of the transmitting partial antennas and receiving partial antennas.

The number of partial antennas of the transmitting module preferably also differs from the number of partial antennas of the receiving module.

This asymmetry causes, in particular, the combinations narrow/wide and wide/narrow to differ which effectively provides, e.g. in the above-mentioned design, four different angular resolutions with minimum expense.

Moreover, each partial antenna preferably also comprises at least two radiation surfaces disposed along one line.

This design already provides the partial antennas with an orientation characteristic which can be predetermined by construction, wherein the respective radiation field becomes more narrow with increasing number of radiation surfaces thereby producing more precise angles.

The radar sensor can also preferably be operated in a pulsed manner in at least one operating mode.

The advantages of the patch antennas are counteracted by the disadvantage of a relatively narrow frequency bandwidth. A large bandwidth is, however, desired since the spatial resolution of reflecting objects, i.e. the minimum possible distance at which two separate objects are recognized as being separate, improves with increasing bandwidth. Pulsed operation increases the limited bandwidth since the time duration delta_t of a signal and the associated frequency range, i.e. the bandwidth, are inversely proportional to each other.

Further advantages can be extracted from the description and the enclosed figures.

It is clear that the features mentioned above and below may not only be used in the respectively stated combination, but also in other combinations or individually without departing from the scope of the invention.

The drawing schematically illustrates embodiments of the invention which are explained in more detail in the following description.

DESCRIPTION OF THE PREFERRED EMBODIMENT

Figure 1:
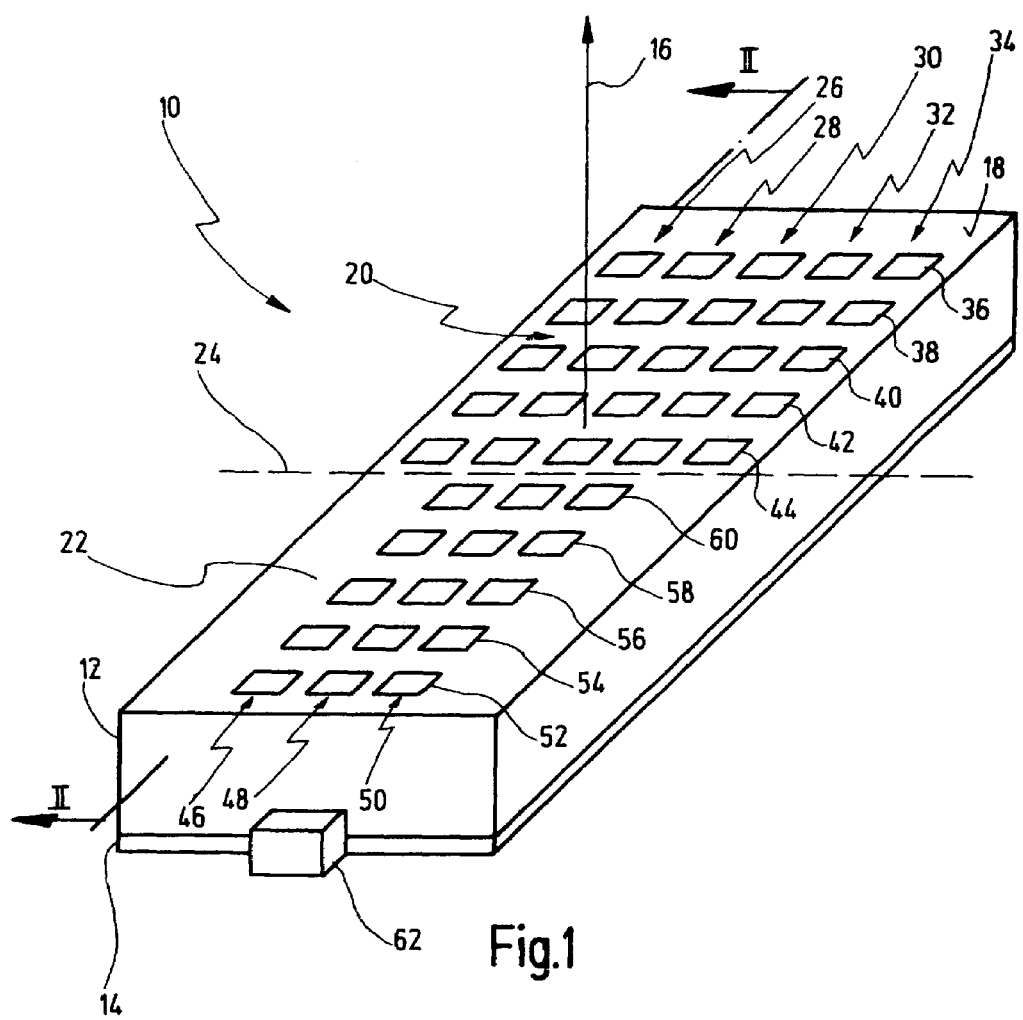
FIG. 1 shows an overall view of a radar sensor.

Reference numeral 10 in FIG. 1 designates the schematic overall view of a radar sensor comprising a housing 12, which is closed by a lid 14. The arrow 16 indicates the direction of the longitudinal axis of a vehicle. The arrangement of the radar sensor 10 relative to the direction 16 corresponds to a typical installation position for monitoring the field in front of a vehicle. The invention is, of course, not limited to such a relative orientation of the radar sensor 10 with respect to the direction 16 of the longitudinal axis of the vehicle.

A flat transmitting module 20 is disposed on a front surface 18 of the radar sensor 10 and is separated from a flat receiving module 22 by an imaginary line 24. The radar sensor 10 shown in FIG. 1 therefore has a transmitting module 20 and receiving module 22 which are spatially separated from another. In the example of FIG. 1, the transmitting module 20 has five partial antennas 26, 28, 30, 32, and 34 which each consist of five radiation surfaces (patches) 36, 38, 40, 42 and 44. Analogous thereto, the receiving module of the example of FIG. 1 comprises three partial antennas 46, 48, 50 which each consist of five radiation surfaces 52, 54, 56, 58, and 60.

It is clear that the transmitting module 20 may have, in general, k partial antennas, each with I radiation surfaces, instead of five partial antennas, and the receiving module 22 may have m partial antennas each with n radiation surfaces each instead of three partial antennas. The number of partial antennas of the transmitting module may thereby differ from the number of partial antennas of the receiving module. Each of the partial antennas is composed of several patch antennas or radiation surfaces which are disposed in a line. The patch antennas may be excited through slit-coupling. The reference numeral 62 designates a connecting element through which e.g. a supply voltage is fed to the radar sensor 10 and/or via which the radar sensor 10 transmits signals to control devices of an automotive vehicle.

Figure 2:
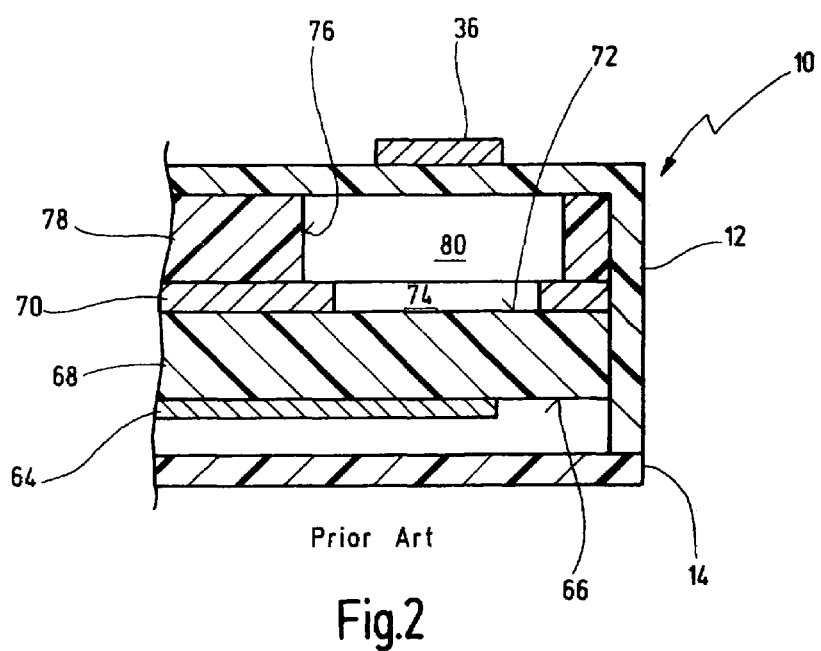
FIG. 2 shows a partial section of the radar sensor of FIG. 1.

FIG. 2 shows a partial section of the radar sensor 10 of FIG. 1, wherein the inner structure of the radar sensor 10 shown in FIG. 2 is known per se. The reference numeral 64 in FIG. 2 designates a supply network which is connected to the connecting element 62 of FIG. 1 and is disposed on a first side 66 of a radio frequency substrate 68. A metallic ground surface 70 is disposed on a second side 72 of the radio frequency substrate 68.

A radiation surface 36 is excited by the supply network 64 via an aperture 74 in the metallic ground surface 70 and via a dielectric disposed between the ground surface 70 and the radiation surface 36 to radiate electromagnetic waves. A recess 76 in an amplifying structure 78 defines an air volume 80 between the radiation surface 36 and the ground surface 70. The air volume 80 forms the dielectric between the ground surface 70 and the radiation surface 36.

The radiation surface 36 is connected to the housing 12 and is preferably disposed on the outside of the housing 12. The radiation surface 36 acts as a resonator and produces electromagnetic radiation through capacitive coupling with the supply network 64. The aperture 74 is generally designed as an elongated slot.

Figures 3, 4:
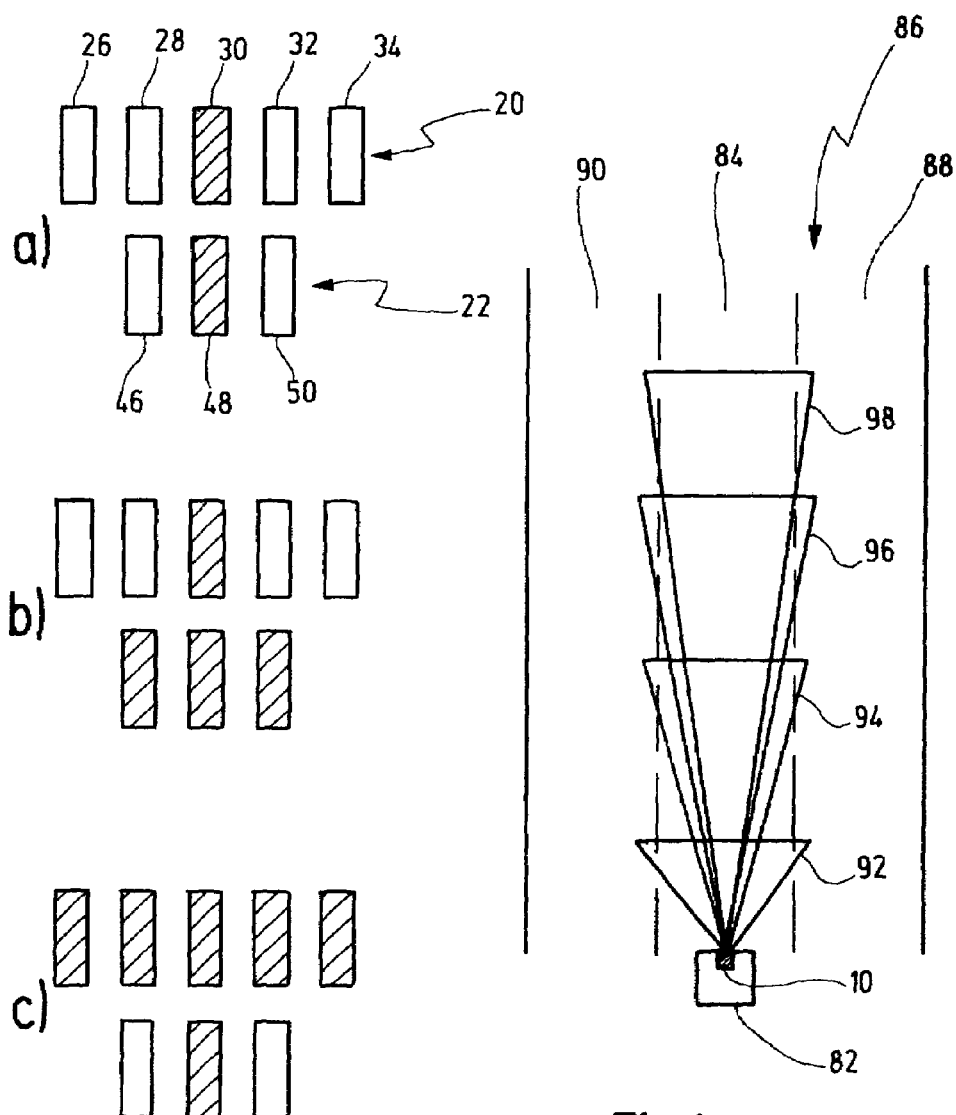
FIG. 3 shows different control-patterns of partial antennas of the radar sensor of FIG. 1.
FIG. 4 shows different angular resolutions which are obtained as a result of the control patterns of FIG. 3.

FIG. 3 shows four different control patterns with which the supply network 64 operates the five partial antennas 26 through 34 of the transmitting module 20 and the three partial antennas 46 through 50 of the receiving module 22 in four different operating modes.

The constellation of FIG. 3a, wherein one partial antenna 30 of the transmitting module 20 is operated with one partial antenna 48 of the receiving module 22, thereby corresponds to the above-mentioned combination wide/wide. In FIG. 4, which shows a vehicle 82 in a central lane 84 of a road 86 with three lanes with right lane 88 and left lane 90, this operating mode provides a wide field of detection 92 of the radar sensor 10 which is well suited for monitoring a blind spot in the field of vision of the driver directly in front of the vehicle 82.

The constellation of FIG. 3a therefore shows a radar system, wherein the supply network 64 operates exactly one partial antenna 30 of the transmitting module 20 together with exactly one partial antenna 30 of the transmitting module 20 together with exactly one partial antenna 49 of the receiving module 22 in a first operating mode.

In the control pattern of FIG. 3b, a wide radiation spectrum is generated through control of only one single partial antenna 30 of the transmitting module 20 and is combined with a narrower angular resolution of the receiving module 22. The narrower angular resolution of the receiving module 22 is generated through controlling a group of partial antennas 46, 48, 50 of the receiving module 22. This overall combination produces a narrower field of vision 94 (shown in FIG. 4).

The group of partial antennas 46, 48, 50 thereby preferably also comprises the at least one partial antenna 48 which is operated in the first operating mode of FIG. 3a. The group of partial antennas preferably, but not necessarily, comprises all partial antennas 46, 48, 50 of the receiving module 22 (as shown in FIG. 3b).

The control pattern of FIG. 3c produces an even narrower field of vision. It initially produces a very narrow radiation characteristic of the transmitting module 20 through control of a group of partial antennas 26, 28, 30, 32, 34 of the transmitting module 20. This very narrow radiation characteristic is combined with a wide or coarse angular resolution of the receiving module 22 which is generated through activation of one single partial antenna 48 of the receiving module 30. This combination produces the overall field of vision designated with reference numeral 96 in FIG. 4 which is narrower than the field of vision 94.

The group of controlled partial antennas 26, 28, 30, 32, 34 of the transmitting module 20 preferably also comprises the at least one partial antenna 30 which is operated in the first operating mode of FIG. 3a. The group of partial antennas preferably, but not necessarily, comprises all partial antennas 26, 28, 30, 32, 34 of the transmitting module 20 (as shown in FIG. 3c).

The difference between the fields of vision 94 and 96 in FIG. 4 results from the fact that a total of six partial antennas 26, 28, 30, 32, 34 and 48 contribute to the production of the field of vision 96 whereas the field of vision 94 is generated by four partial antennas 30 and 46, 48, 50.

FIG. 3d shows a control pattern which produces a maximum fine angular resolution. Towards this end, a narrow radiation characteristic is combined with a narrow receiving angle of a narrow angular resolution of the receiving module 22. All partial antennas 26, 28, 30, 32, 34 of the transmitting module 20 and partial antennas 46, 48, 50 of the receiving module 22 are operated together for the narrow radiation characteristic. The resulting narrow field of vision 98 of the radar sensor 10 is also shown in FIG. 4. As can be seen from FIG. 4, the field of vision 98 is best suited for distance monitoring since it does not cover the neighboring lanes 88 and 90, even at a larger distance in front of the radar sensor 10 and the vehicle 82. The large blind spot directly in front of the vehicle 82 is, however, disadvantageous.

Suitable control provides switching between the different operating modes of FIG. 3 in a cyclic manner or depending on the requirements. The travelling speed is a possible requirement criterion. At high speeds, narrow fields of vision will generally be more favorable and at lower speeds, wide fields of vision will be more useful.

A combination of FIGS. 1 through 4 discloses a radar system comprising a radar sensor 10 having a transmitting module 20, a receiving module 22 and a supply network 64, wherein the transmitting module 20 comprises a first plurality of partial antennas 26, 28, 30, 32, 34 and the receiving module 22 comprises a second plurality of partial antennas 46, 48, 50, and wherein the feed network 64 operates at least one partial antenna 30 of the transmitting module 20 together with at least one partial antenna 48 of the receiving module 22 in a first operating mode (FIG. 3a) to obtain a first, low angular resolution with a wide field of vision 92, and wherein the supply network 64 operates one group of partial antennas 26, 28, 30, 32, 34 of the transmitting module 20 together with one group of partial antennas 46, 48, 50 of the receiving module 22 in a second operating mode (FIG. 3d), to obtain a second high angular resolution with a narrow field of vision 98. The supply network 64 additionally operates at least one partial antenna 30 of the transmitting module 20 together with a group of partial antennas 46, 48, 50 of the receiving module 22 in one further operating mode (FIG. 3b), or (FIG. 3c) a group of partial antennas 26, 28, 30, 32, 34 of the transmitting module 20 together with at least one partial antenna 48 of the receiving module 22.

Figure 5:
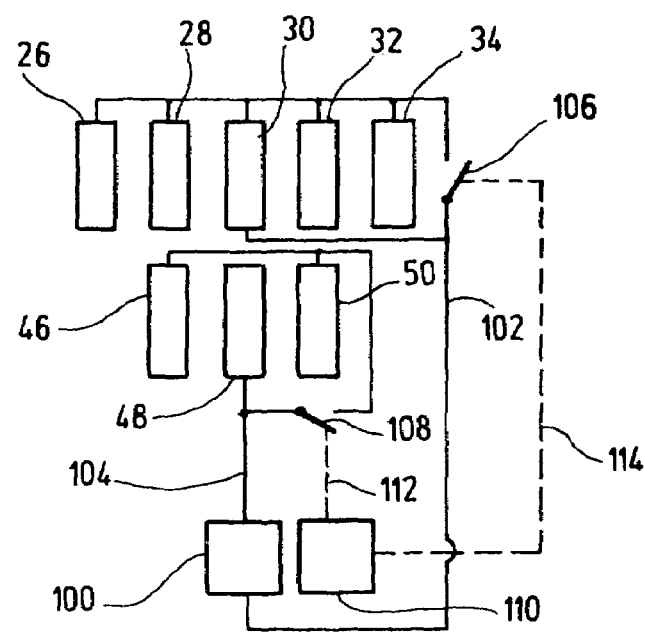
FIG. 5 shows a first embodiment of a switch for controlling different groups of partial antennas.

FIG. 5 shows the arrangement of the partial antennas 26, 28, 30, 32, 34, and 46, 48, 50 together with a first embodiment of the supply network 64. This design is initially characterized in that the partial antennas 30, 48 which are operated together in a first operating mode, are each separately connected to a partial excitation switch 100 of the supply network 64. The partial antenna 30 is thereby connected via a path 102 and the partial antenna 48 is connected via a path 104. The design of FIG. 5 is also characterized in that the remaining partial antennas of a group are each connected to the partial excitation switch 100 by one common switch 106 or 108. In the design of FIG. 5, the group connected via the switch 106 is defined by all other partial antennas 26, 28, 32, 34 of the transmitting module 20. Analogous thereto, the group connected via the switch 108 is defined by all other partial antennas 46, 50 of the receiving module 22.

The switches 106 and 108 are operated by a controller 110 via paths 112 and 114. The controller 110 may be integrated in the radar sensor 10 or may be an external controller which communicates with the supply network 64 via the connecting element 62. The external controller may, in particular, be a motor control device and/or a brake control device and/or an airbag control device of the vehicle 82.

The controller 110 controls methods for operating the radar sensor 10 and controls, in particular, the switching between different operating modes which were explained through examples with reference to FIGS. 3 and 4. The radar sensor 10 may thereby be operated in a pulsed manner in at least one operating mode to further improve the angular resolution.

Figure 6:
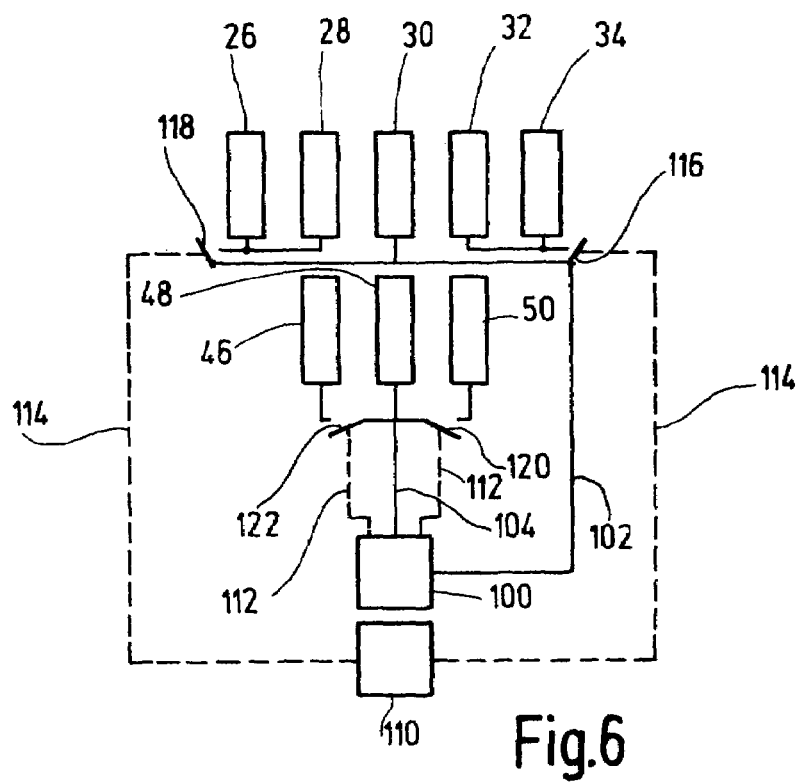
FIG. 6 shows a second embodiment of a switch for controlling different groups of partial antennas.

FIG. 6 shows an arrangement of the partial antennas 26, 28, 30, 32, 34 and 46, 48, 50 together with a second design of the supply network 64. The second design of FIG. 6 differs from the first design of FIG. 5 in that one single switch 106 was replaced by two switches 116, 118 and one individual switch 108 was replaced by two switches 120, 122. The paths 102 and 104 may thereby be shorter than those of FIG. 5.

We claim:

1. A radar system with a radar sensor having a transmitting module, a receiving module and a supply network, wherein the transmitting module and the receiving module each have a plurality of partial antennas, the system comprising:
    means for activating the supply network to operate at least one first partial antenna of the transmitting module together with at least one second partial antenna of the receiving module in a first operating mode, to obtain a first, low angular resolution;
    means for activating the supply network to operate a first group of partial antennas of the transmitting module together with a second group of partial antennas of the receiving module in a second operating mode to obtain a second, high angular resolution; and
    means for activating the supply network in at least one further operating mode to operate at least one third partial antenna of the transmitting module together with a third group of partial antennas of the receiving module or to operate a fourth group of partial antennas of the transmitting module together with at least one fourth partial antenna of the receiving module.

2. The radar system of claim 1, wherein the supply network operates exactly one first partial antenna of the transmitting module together with exactly one second partial antenna of the receiving module in said first operating mode.

3. The radar system of claim 1, wherein said first and said fourth group of partial antennas each include said at least one first partial antenna and said second and said third group of partial antennas each include said at least one second partial antenna.

4. The radar system of claim 1, wherein said first and said fourth group of partial antennas include all partial antennas of the transmitting module and said second and said third group of partial antennas include all partial antennas of the receiving module.

5. The radar system of claim 1, further comprising an excitation switch to separately connect said at least one first partial antenna and said at least one second partial antenna to the supply network.

6. The radar system of claim 5, further comprising a common switch to connect said first or said fourth group of partial antennas, with the exception of said at least one first partial antenna, to said excitation switch and for connecting said second or said third group of partial antennas, with the exception of said at least one second partial antenna, to said excitation switch.

7. The radar system of claim 1, wherein each partial antenna consists essentially of a slit-coupled patch antenna.

8. The radar system of claim 1, wherein the transmitting module is disposed on the radar sensor at a spatial separation from the receiving module.

9. The radar system of claim 1, wherein a number of partial antennas of the transmitting module differs from a number of partial antennas of the receiving module.

10. The radar system of claim 7, wherein each partial antenna comprises at least two radiation surfaces disposed along a line.

11. The radar system of claim 1, wherein the radar sensor is operated in a pulsed manner in at least one operating mode.

12. A method for operating a radar system with a radar sensor having a transmitting module, a receiving module and a supply network, wherein the transmitting module and the receiving module each have a plurality of partial antennas, the method comprising the steps of:
    a) activating the network to operate at least one first partial antenna of the transmitting module together with at least one second partial antenna of the receiving module in a first operating mode, to obtain a first, low angular resolution;
    b) activating the supply network to operate a first group of partial antennas of the transmitting module together with a second group of partial antennas of the receiving module in a second operating mode to obtain a second high angular resolution; and
    c) activating the supply network in at least one further operating mode to operate at least one third partial antenna of the transmitting module together with a third group of partial antennas of the receiving module or to operate a fourth group of partial antennas of the transmitting module together with at least one fourth partial antenna of the receiving module.

* * * * *